United States Patent [19]

Coplan et al.

[11] Patent Number: 4,632,756
[45] Date of Patent: Dec. 30, 1986

[54] MULTIPLE BUNDLE SEPARATORY MODULE

[75] Inventors: Myron J. Coplan, Natick; Friedhelm Bilewski, Medway; Robert Sebring, Westwood, all of Mass.; Daniel K. Schiffer, Neenah, Wis.

[73] Assignee: Albany International Corp., Menands, N.Y.

[21] Appl. No.: 665,090

[22] Filed: Oct. 26, 1984

Related U.S. Application Data

[63] Continuation of Ser. No. 410,527, Aug. 23, 1982, abandoned.

[51] Int. Cl.⁴ ............................................. B01D 13/00
[52] U.S. Cl. ............................ 210/323.2; 210/433.2; 210/456
[58] Field of Search ................. 210/456, 323.2, 497.1, 210/321.1, 433.2

[56] References Cited

U.S. PATENT DOCUMENTS

| | | | |
|---|---|---|---|
| 3,880,755 | 4/1975 | Thomas et al. | 210/433.2 X |
| 3,953,334 | 4/1976 | Brun et al. | 210/321.1 |
| 4,045,851 | 9/1977 | Ashare et al. | 210/497.1 X |
| 4,210,536 | 7/1980 | Coplan et al. | 210/321.1 |
| 4,293,419 | 10/1981 | Sekino et al. | 55/158 X |
| 4,352,736 | 10/1982 | Ukai et al. | 210/323.2 X |
| 4,400,276 | 8/1983 | Bollinger et al. | 210/323.2 |
| 4,451,369 | 5/1984 | Sekino et al. | 210/323.2 X |

Primary Examiner—Frank Spear
Attorney, Agent, or Firm—Kane, Dalsimer, Kane, Sullivan & Kurucz

[57] ABSTRACT

A separatory module is disclosed with a cylindrical shell and two ends. Within the shell there are several fiber bundles extending in parallel to a longitudinal axis of the shell for separating permeates from a fluid. Each bundle is supported by one of the ends. The permeate as well as the remaining concentrates may be collected from either end.

8 Claims, 11 Drawing Figures

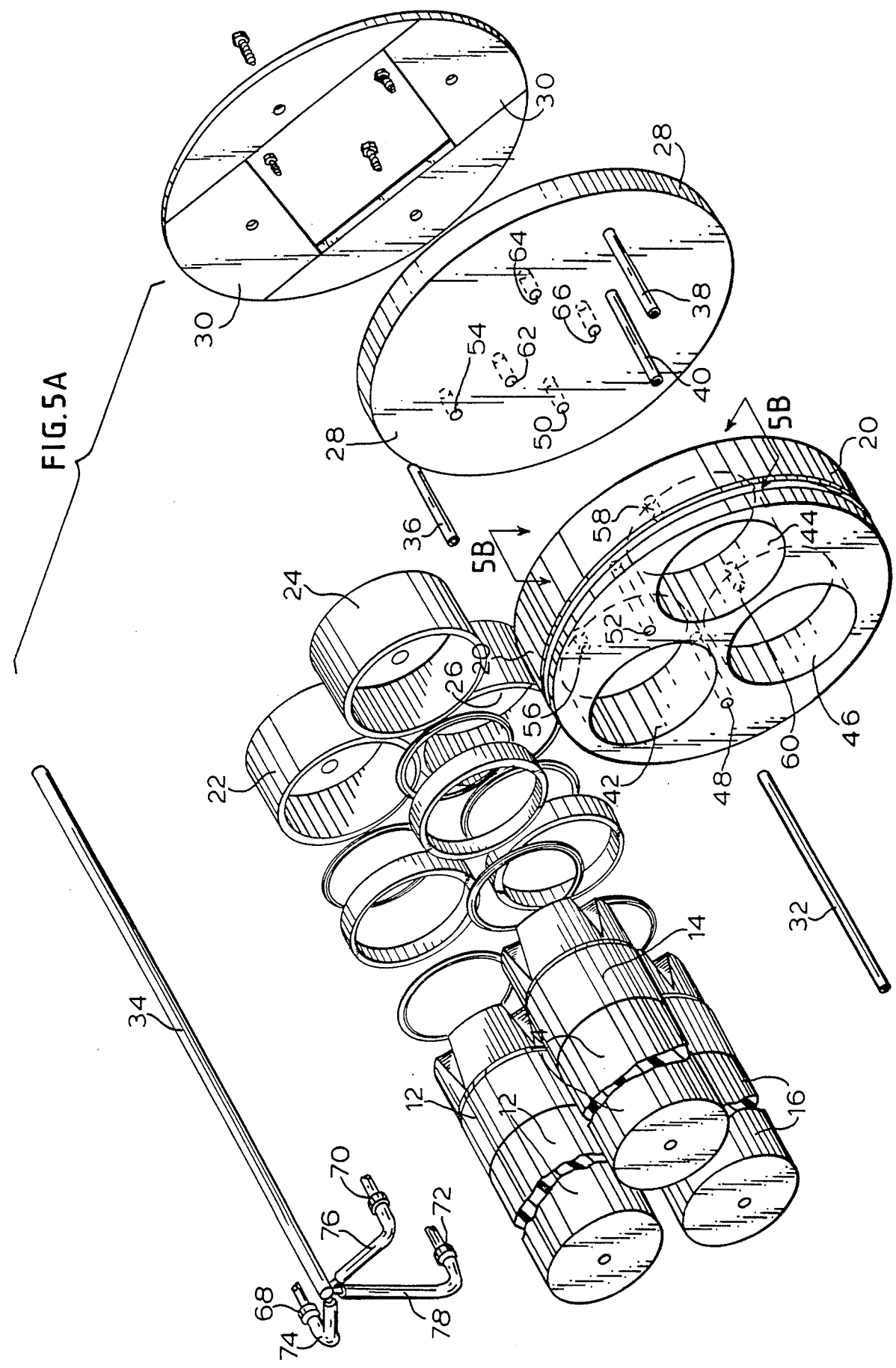

MULTIPLE BUNDLE SEPARATORY MODULE

The Government has rights in this invention pursuant to Contract No. 14-34-0001-7551 awarded by the Office of Water Research and Technology of the United States Department of the Interior.

This is a continuation of co-pending application Ser. No. 410,527 filed on Aug. 23, 1982 now abandoned.

BACKGROUND OF THE INVENTION

The use of membranes to effect separation of gas/gas, liquid/liquid, and liquid/solid mixtures and solutions has achieved general industrial applicability by various methods, among them being ultrafiltration, hyperfiltration, reverse osmosis, dialysis. In general, membrane elements associated with these processes are contained in vessels, comprising a container having various inlet and outlet ports and an assembly of membranes within said container, the entire assembly being referred to as a module. The internal configurations are so arranged as to permit the introduction of a feed stream with or without pressure on the upstream face of the membranes, means for collecting permeate which passes through the membranes and emerges on their downstream faces, and means for keeping feed and permeate materials from comingling.

Membranes have been fabricated in various shapes, such as (1) flat sheets which may be supported in a typical plate and frame structure similar to a filter press; (2) flat sheets rolled into spirals with spacing materials interleaved with the membrane and the assembly sealed to provide spiroidal channels permitting the passage of a feed on one side of the coiled membrane through spaces to the opposite side of the membrane; (3) as tubes lining the inner surface of a reinforced braid, the braid itself at times being a component in a larger tube; and (4) in the form of open-ended hollow fibers so organized and sealed into header plates as to provide a separation of the flows over the external surfaces of the hollow fibers from any flow within the bores of the hollow fibers ensuing by virtue of a passage of permeate across the membrane.

Of particular interest is the use of hollow fibers assembled in bundle form to provide the desired separation In U.S. applications for Letters Patent Ser. Nos. 943,738 filed Sept. 19, 1978, 943,739 filed Sept. 19, 1978, 943,793 filed Sept. 19, 1978 and 956,032 filed Oct. 30, 1978, various techniques for the selection and winding of hollow fibers and the fabrication and assembly of such fibers into modular form is taught. It is noted however that for the practical usage of such modules in commercial application, small bundles in single bundle housings are too small. On the other hand as taught in the above noted applications other limitations exist which restrict the size of individual bundles.

SUMMARY OF THE INVENTION

The present invention provides a unique multiple bundle separatory module which is useful in commercial applications. It is disclosed herein in an embodiment utilizing a quantity of six bundles in a single housing; however it is not limited to that number and the invention can be adapted to accommodate varying numbers of bundles. The invention can be provided to have feed material flowing into the housing over the six bundles and the feed can be from a single end or from both ends of the cylindrical housing shell. The permeates and concentrates can be at will collected from any one or any group of bundles from either end.

Provision can be made for feeding radially inward toward the center of each bundle, radially outward toward each bundle perimeter, or parallel to the longitudinal axis of each bundle.

Within the teachings of this invention various choices of component materials and configurations are possible.

A further and significant advantage of the present invention is that it allows for modular construction in that one or more of the small bundles can be easily replaced on a selective basis.

BRIEF DESCRIPTION OF THE DRAWINGS

FIG. 5A is an exploded partially sectional view of the module illustrating the manner of assembly.

DESCRIPTION OF THE PREFERRED EMBODIMENT

Figure 1A:
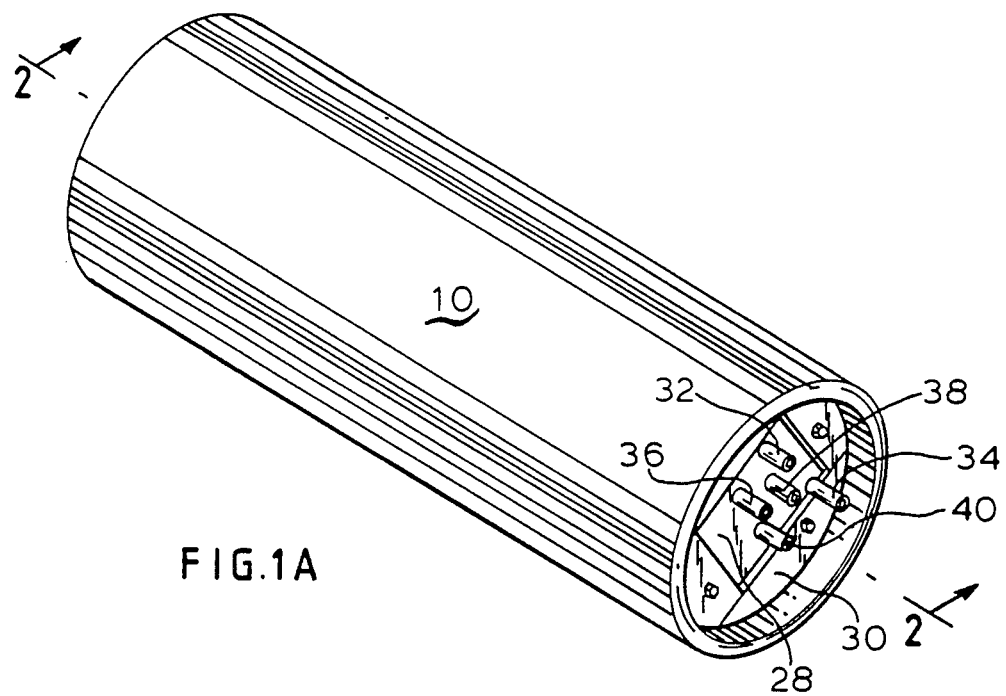
FIG. 1A is a perspective view of a multiple bundle separatory module constructed in accordance with the teachings of this invention as viewed from the front.
Figure 1B:
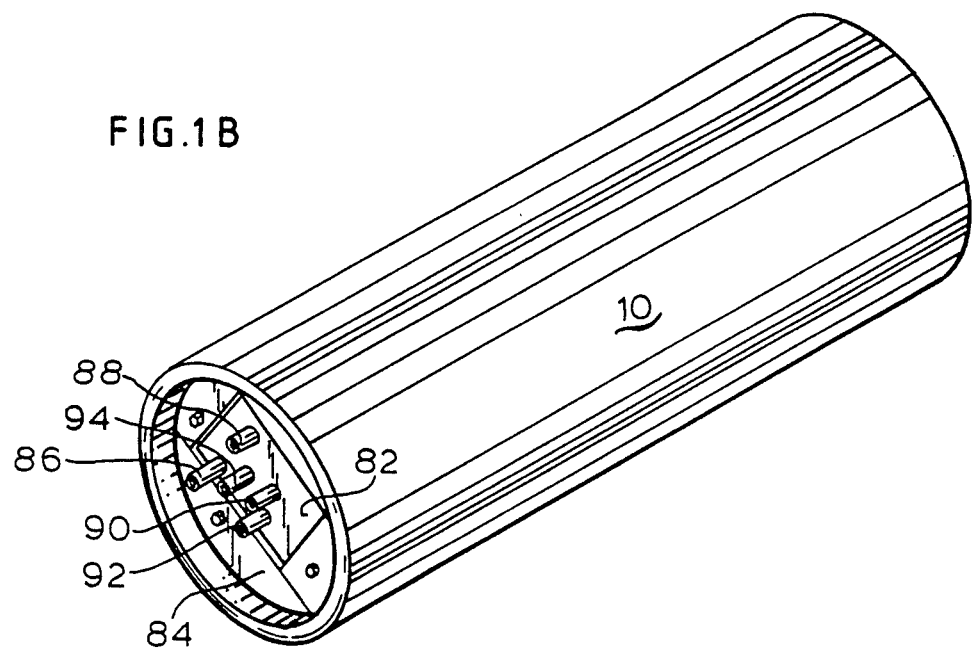
FIG. 1B is a view of the module similar to that of FIG. 1A but as viewed from the rear.
Figure 2:
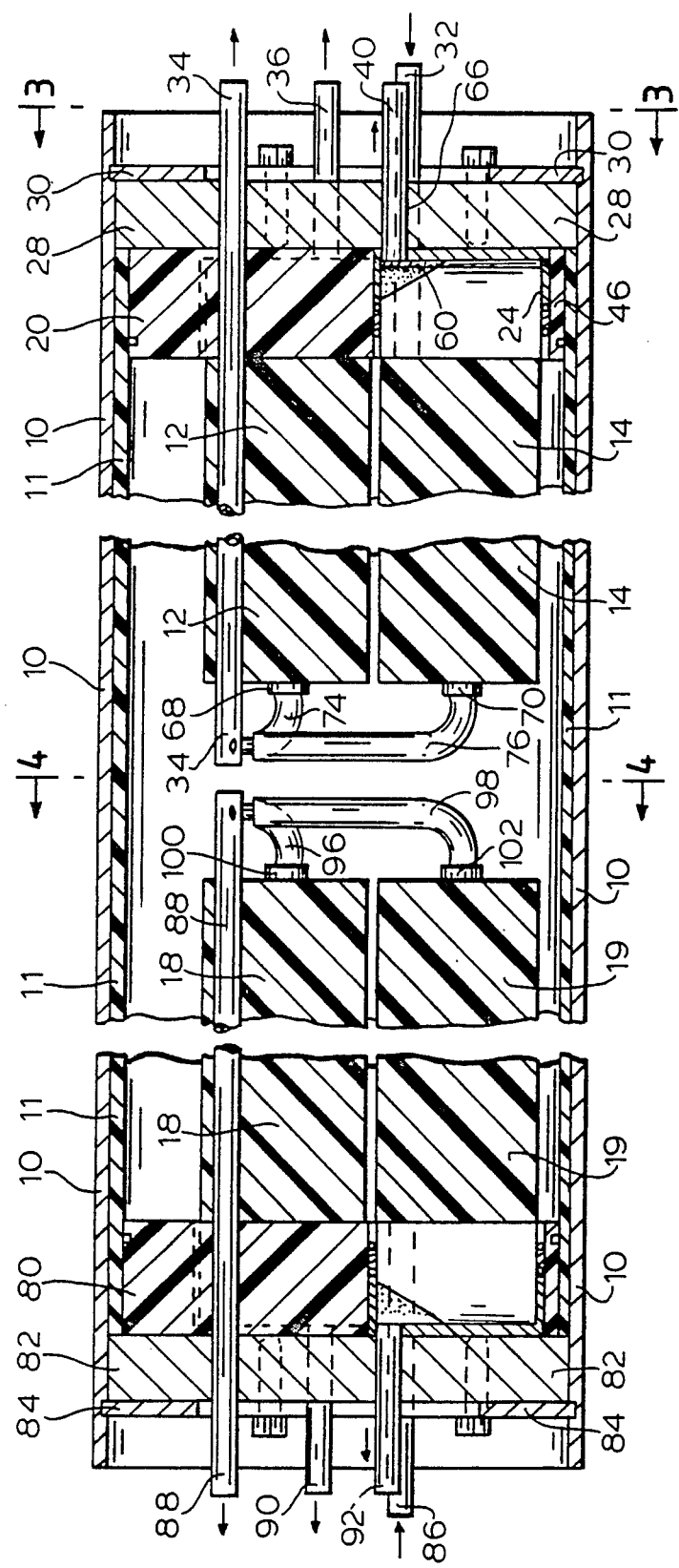
FIG. 2 is a longitudinal sectional view of the module shown in FIG. 1A along lines 2—2.
Figure 3:
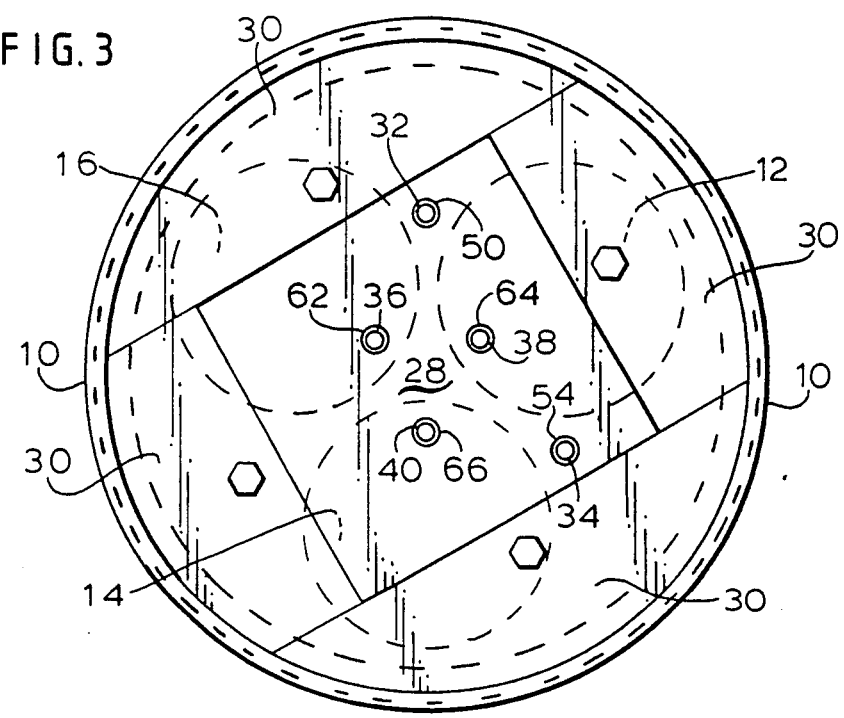
FIG. 3 is a front view of the module taken along the line 3—3 in the direction of the arrows in FIG. 2.
Figure 4:
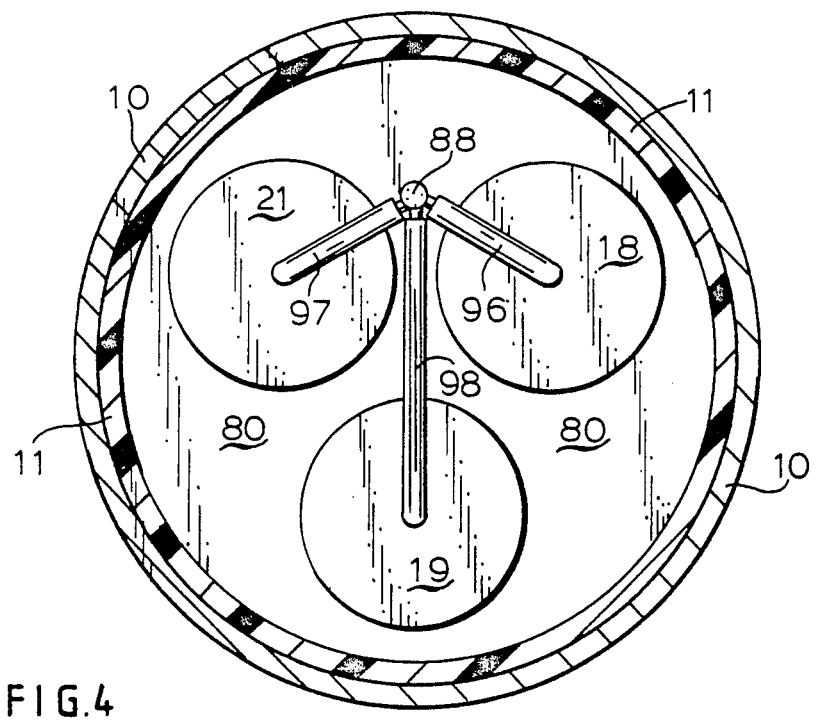
FIG. 4 is an interior view taken from the position defined by line 4—4 in the direction of the arrows in FIG. 2.

As seen in FIGS. 1-5 the module in one embodiment includes an outer cylindrical pressure shell 10 which may be mild steel, filament wound plastic, etc., with an inert impervious inner liner 11 which may be vinyl, Teflon, polysulfone, etc., and six hollow fiber bundles which can be fabricated in accordance with the teachings of the application for Letters Patent referred to above. In FIG. 2 only four bundles 12, 14, 18, and 19 are visible. In the views shown in FIGS. 3 and 4, three bundles are indicated on each end.

Figure 5B:
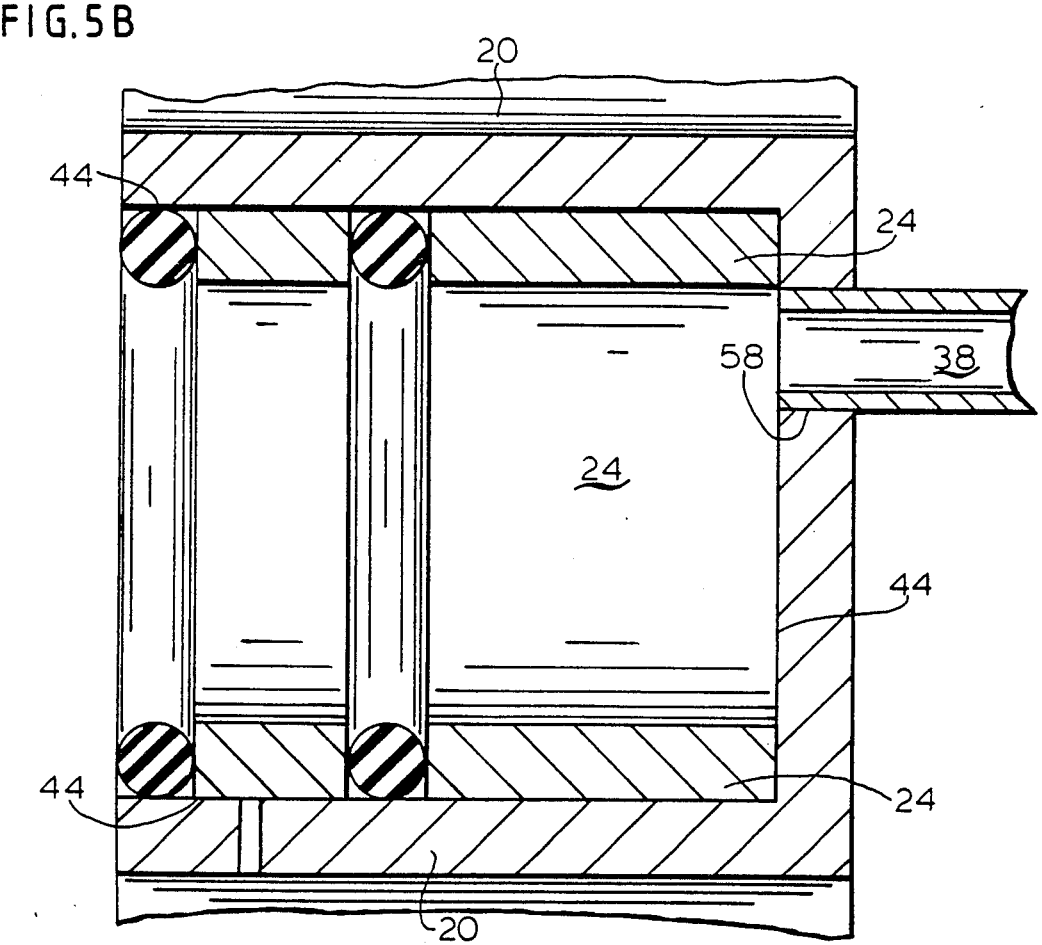
FIG. 5B is a sectional view along lines 5B—5B of FIG. 5A.

As seen in FIG. 2 and in the exploded view of FIG. 5 the front cluster in addition to the bundles 12, 14 and 16 includes a monolithic inert base, typically vinyl polymer, 20 having three cylindrical cavities 42, 44 and 46 in which respective bundles 12, 14 and 16 with respective potted ends 22, 24, and 26 are inserted, backed by reinforcing backup disc 28, which may be stainless steel, fiber-reinforced plastic, etc., bolted thereto and segmented retainer 30. A single feed tube 32 is provided as is a single concentrate tube 34. There are three tubes 36, 38 and 40 for removal of permeate from each bundle separately.

In FIG. 5 the cavities for receiving bundles 12, 14 and 16 are respectively indicated by the numerals 42, 44 and 46. The plate perforations for passage of the feed tube 32 through base 20 and disc 28 are respectively numbered 48 and 50. The plate perforations for passage of the concentrate tube 34 through base 20 and disc 28 are respectively numbered 52 and 54. Additionally the plate perforations for passage of permeate tubes 36, 38 and 40 through base 20 are labeled 56, 58 and 60 respectively and for passage through disc 28 are labeled 62, 64 and 66 respectively.

The arrangement is such that the feed port at perforation 50 is open to the chamber within which the bundles 12, 14 and 16 are disposed so that the feed can flow over the outer surfaces of the fibers. Each of the bundles is provided with a rigid center tube such as tubes 68, 70 and 72 which are respectively connected to concentrate tube 34 by flexible tubing 74, 76 and 78. The permeate is received from the hollow fibers in galleries formed in the potting compound at the end of each bundle in suitable manner such as that taught in the applications for United States Letters Patent identified above.

A similar arrangement is provided at the rear end whereat there is seen vinyl base 80, backup disc 82, segmented retainer 84, feed tube 86, concentrate tube 88, and permeate tubes 90, 92, and 94.

The assembly steps include first assembling the outer shell and liner separately and inserting the individual bundles in the cavities of the base. The base is backed by the backup disc and the two bolted together. The three are assembled and the segmented retainer applied.

Figure 6:
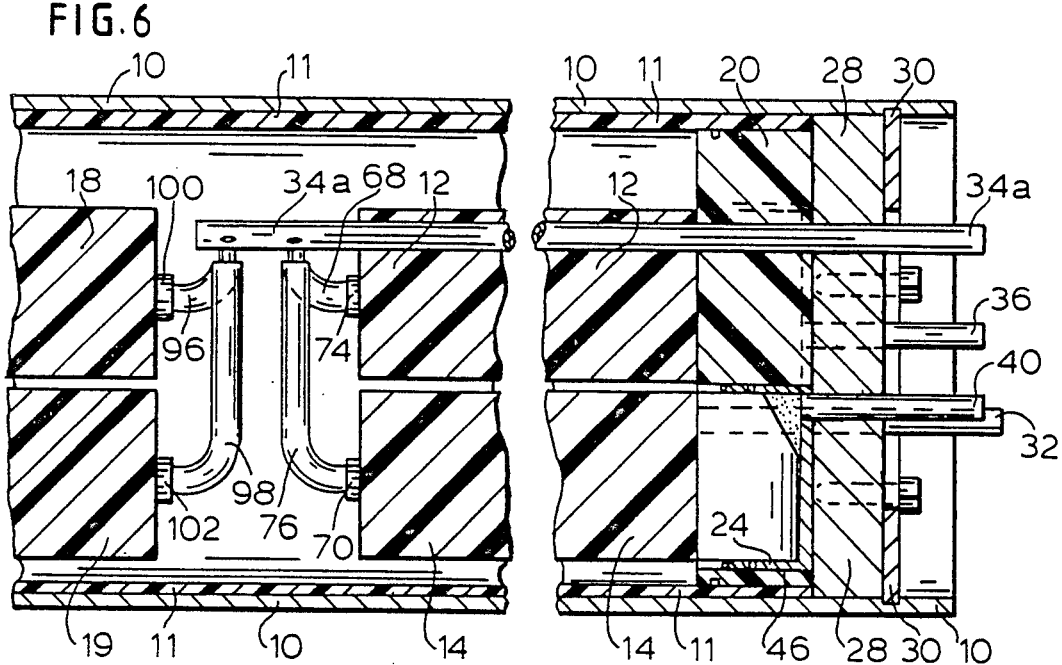
FIGS. 6 and 7 are longitudinal sections views of respective alternative embodiments of the invention.

Variations of flow paths can be accomplished with the assembly shown in FIGS. 1-5. For example, the feed can be from one end only rather than both ends by merely plugging the feed tube at one end. The recovery of concentrate can be from one end only rather than both ends as shown in FIG. 6 wherein the concentrate tube has been modified as is indicated by the numeral 34a and tubes 96 and 98 are shown connected to rigid rods 100 and 102 in modules 18 and 19 and to tube 34a.

Both of the embodiments described above contemplate radially inward feed with center concentrate extraction, with the concentrate tube within each bundle provided with perforations. This can be reversed so as to have radially outward feed operation. Inside the units the tubes have equal pressure on the inside and the outside surfaces and therefore do not require radial strength in the tubing.

Additionally, the flow pattern if desired can be parallel to the axis of the bundle if a confining outer sleeve is provided around each bundle and the feed is introduced at the unpotted end of each bundle. Thus there will be longitudinal flow over the individual bundle outer surfaces thereby creating higher velocities over the fibers to minimize concentration polarization effects.

In view of the design various materials can be substituted and components modified. The outer shell may be mild steel, other metals, reinforced plastic, and the like. In some situations the inert inner liner may be omitted. Additionally the inside surface of a metal outer shell can be epoxy coated and the liner omitted. The support disc 28 could also be fiber reinforced plastic for example.

In an embodiment disclosed it is contemplated that the permeates be collected near the potted ends of fiber bundles separately as described in the applications for United States Letters Patent identified above. This can be varied however, for example the perforations in the monolithic disc 20 can be fitted with O-rings held in by retaining rings or grooves which will provide a collection gallery. Such a design further lends itself to the provision of a single collection gallery such as a plastic plate with a reinforcing backing—to take the thrust—and with all three bundles at one end connecting therewith. The choices in the potted termination of the bundle collection gallery for permeate are many therefore and embrace alternative cutting geometries, pot configurations, relieving the plastic holding member to provide a collection gallery.

Figure 7:
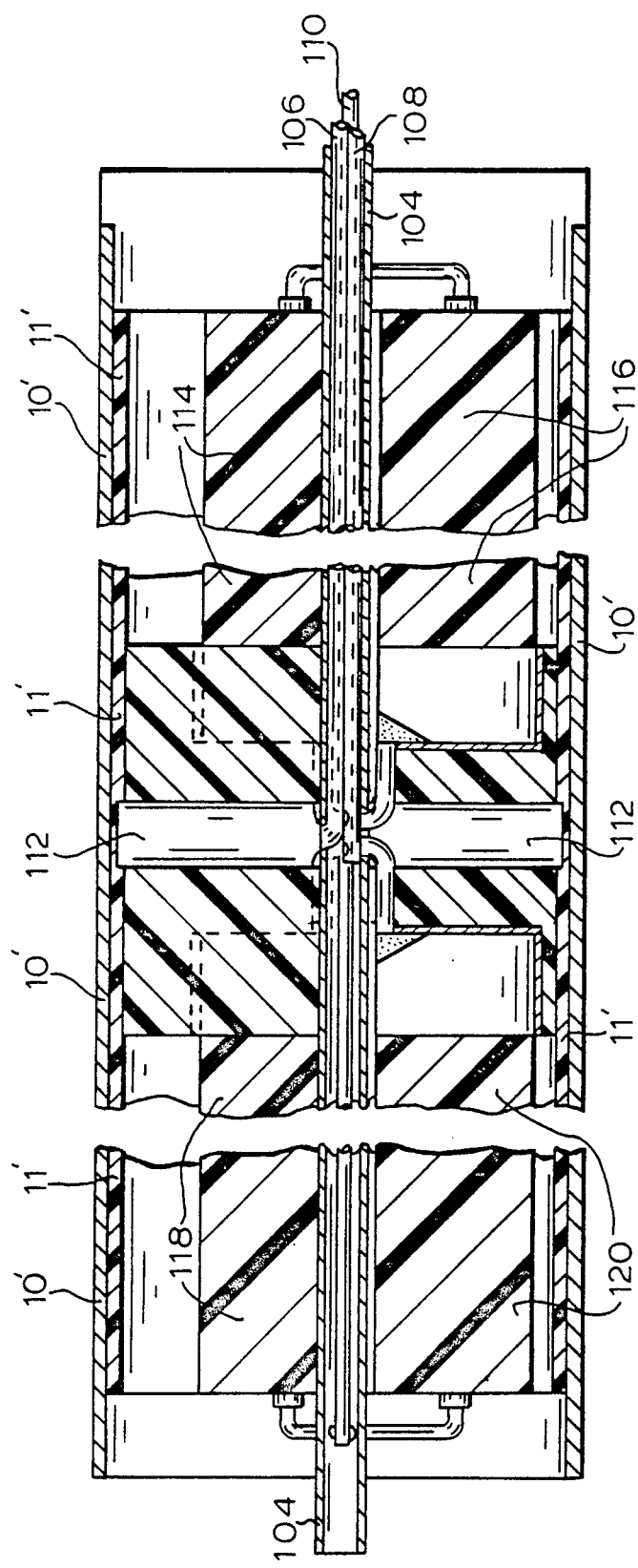
Figure 8:
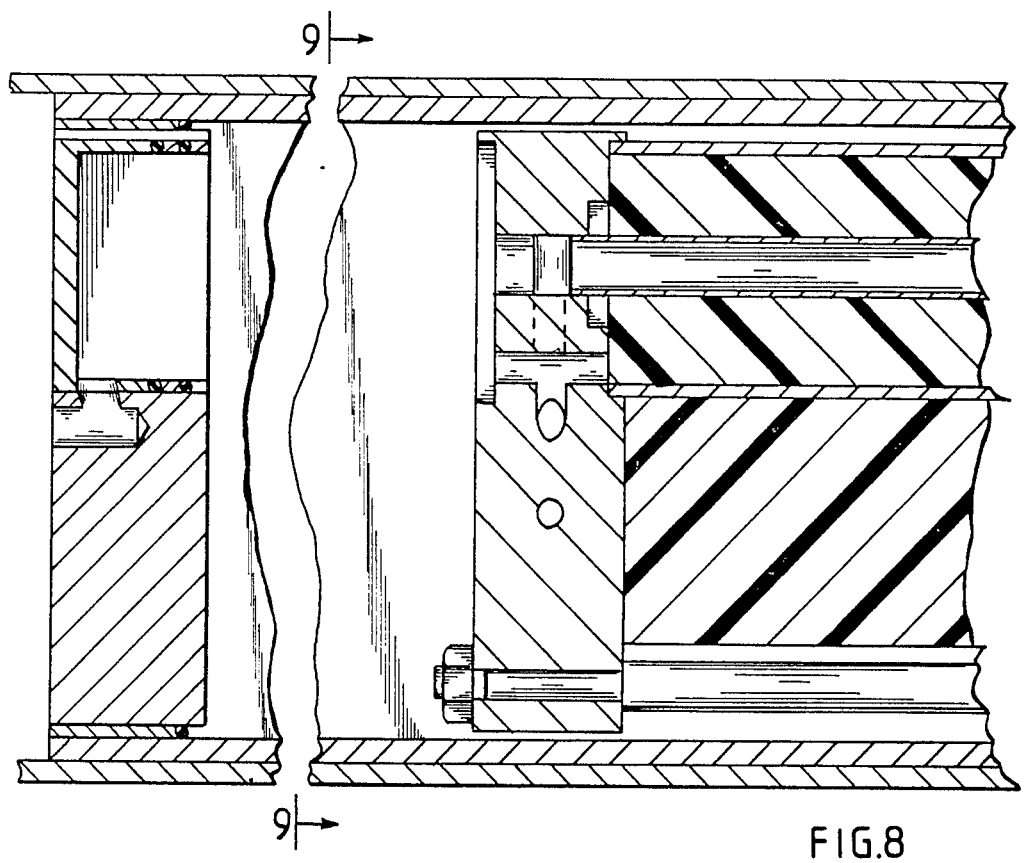
FIGS. 8 and 9 indicate details of internal assembly features of one embodiment.
Figure 9:
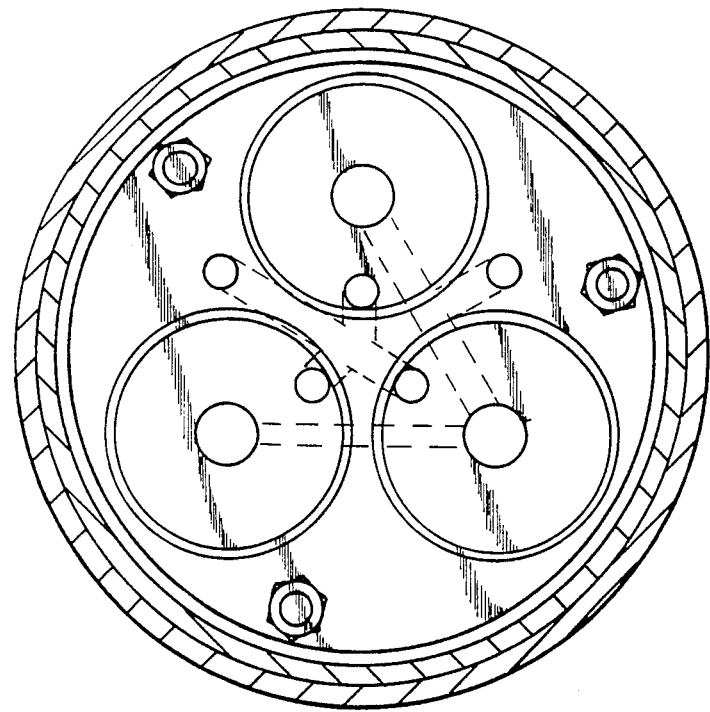

A further embodiment is shown in FIG. 7 where parts similar to those of the previously described designs have the identification numerals given previously with "primes" following. In the embodiment of FIG. 7 rather than utilizing retainer members, a pipe 104 is disposed on the longitudinal axis of the shell 10'. The pipe 104 is designed as a structural member and can also be utilized to feed or extract. In the embodiment of FIG. 7 however, three pipes 106, 108, and 110 are within pipe 104 with pipe 106 providing the feed and pipes 108 and 110 respectively providing the output for permeate and concentrate.

With the central load bearing pipe 104 many advantages follow—such as a fiberglass casihg could be used more readily as there would be no need for the casing to support the end plates which take the thrust.

The utilization of the central support pipe 104 can allow for a unit in which a single central permeate collection chamber 112 receives permeate from centrally located facing potted zones, four of which are shown and indicated by the numerals 114, 116, 118, and 120.

We claim:

1. A separatory module comprising a plurality of bundles of hollow fiber membranes formed as helically wound self supporting annulus potted at one end including, a cylindrical impervious pressure shell, a cluster of said bundles within said shell having their axis parallel to but displaced from the shell axis, a base member provided with cavities to receive the potted ends of said bundles, said bundle being supported and secured only by said one end, a back-up disc disposed to support internal hydraulic thrust on said potted bundle ends, fluid feed means for admission of pressurized feed into said pressure shell and for distributing feed fluid uniformly to said bundles in said pressure shell, means for collecting and removing permeate passing through said fiber membranes coupled to said potted ends of said bundles, and means for collecting and removing concentrated non-permeated feed fluid from said bundles.

2. A separatory module as in claim 1, wherein a first and a second cluster of bundles are positioned in said pressured shell each having a respective base for supporting the corresponding cluster said clusters being disposed in axial relationship to one another with their respective bases located at opposite ends of the said pressure shell.

3. A separatory module as in claim 2 wherein the fluid feed means directs the flow of feed within each bundle parallel to its axis.

4. A separatory module as in claim 2 wherein the concentrate fluid collection means for each bundle comprises a perforated tube element lying along the central axis of said bundle.

5. A separatory module as in claim 2 wherein the fluid feed means directs the flow of feed within each bundle radially inward toward its central axis.

6. A separatory module as in claim 1 wherein the fluid feed means directs the flow of feed within each bundle parallel to its axis.

7. A separatory module as in claim 1 wherein the concentrate fluid collection means for each bundle comprises a perforated tube element lying along the central axis of said bundle.

8. A separatory module as in claim 1 wherein the fluid feed means directs the flow of feed within each bundle radially inward toward its central axis.

* * * * *